A. DE ROSA.
VEHICLE WHEEL RIM.
APPLICATION FILED JUNE 10, 1916.
1,244,037.
Patented Oct. 23, 1917.
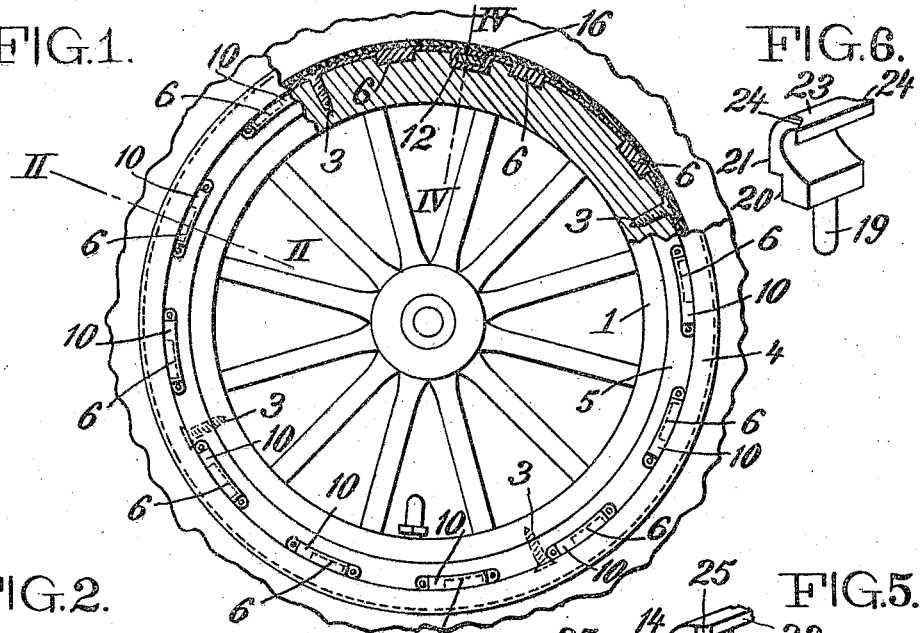
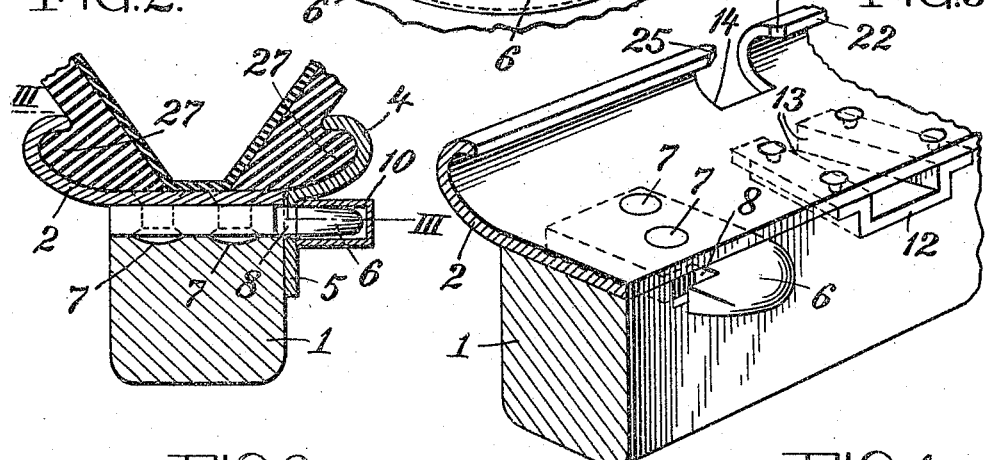
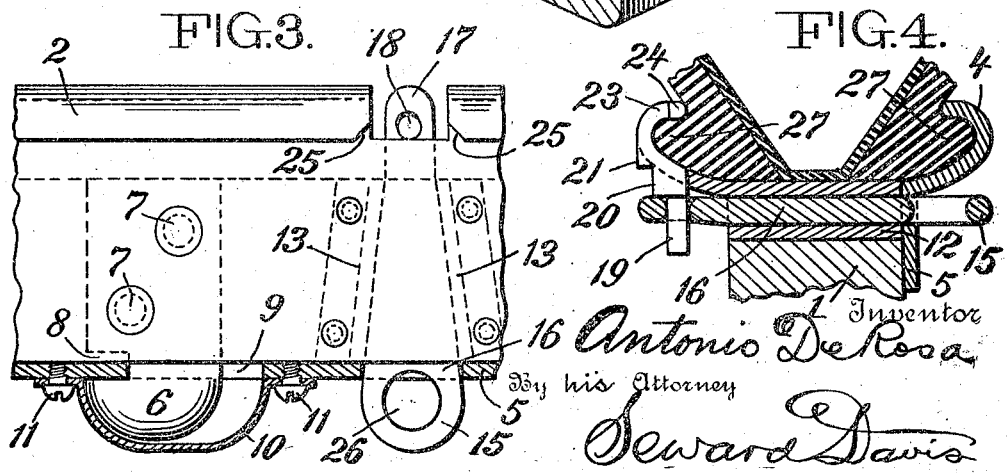
Inventor
Antonio De Rosa
By his Attorney
Seward Davis

UNITED STATES PATENT OFFICE.

ANTONIO DE ROSA, OF BROOKLYN, NEW YORK.

VEHICLE-WHEEL RIM.

1,244,037. Specification of Letters Patent. Patented Oct. 23, 1917.

Application filed June 10, 1916. Serial No. 102,849.

*To all whom it may concern:*

Be it known that I, ANTONIO DE ROSA, a subject of the King of Italy, residing in the borough of Brooklyn, city of New York, county of Kings, and State of New York, have invented a new and useful Improvement in Vehicle-Wheel Rims, of which the following is a full, clear, and exact description.

My invention relates to an improved vehicle wheel rim of the automobile type commonly known as "quick-detachable" rims, or those in which a portion of the rim carrying the tire may be removed for releasing the tire so that it can be easily taken off and replaced by another.

The particular objects of my invention are to provide a tire-carrying rim either of the clencher or straight side variety, from which the tire may be readily and easily detached without the use of tools. Also, the production of a rim which by its simplicity of design may be cheaply manufactured; and further, one that shall afford positive fastening means for attachment of the tire thereto and of the parts of the rim together of such strength that the strains encountered in service may be borne with certainty and safety.

These and other objects of my invention are attained by the particular embodiment thereof chosen for the purpose of illustration and shown in the drawings forming part of this specification, in which drawings Figure 1 is a view in elevation of a vehicle wheel to which a clencher rim is shown as attached, the pneumatic tire being broken away and a portion of the rim, felly and tire being also broken away and shown in median section; Fig. 2 is a cross-section of the wheel felly, rim and a portion of the tire on the line II—II of Fig. 1; Fig. 3 is a plan view of a portion of the rim, a part being shown in section on the line III—III of Fig. 2; Fig. 4 is a sectional view on the line IV—IV of Fig. 1; Fig. 5 is a perspective view of the felly and rim with the detachable flange removed therefrom; Fig. 6 is a form of wedge pin used in locking the detachable flange to the felly. In these several figures like reference numerals indicate the same parts throughout.

Referring to the drawings in detail, 1 is the felly of a vehicle wheel upon which is mounted a rim 2 shown herein as a clencher rim, which is affixed to the felly by suitable means such as screws 3. This rim has a detachable flange 4 forming an endless ring having a centrally projecting flange 5 adapted to seat against the side of the wheel felly. On the under-surface of the rim are fixed a spaced series of hooks 6 which may be formed integral with the rim or riveted thereto by the rivets 7, as shown. I preferably employ 12 of these hooks, but it is obvious that the number may be varied in accordance with the type, size and weight of the rim. Each of these hooks has a recess 8 formed therein. The projecting portion 5 of the removable flange has a series of slotted openings 9 therethrough spaced to correspond to said hooks, so that when the removable flange 4 is applied to the wheel felly, the hooks 6 will project through the slots 9, and, by a limited rotation of the flange, the recess 8 in such hooks will engage the wall of the flanged portion 5, as shown in Fig. 3. A housing or pocket 10 is preferably formed upon the flange 5 of the removable ring for the head of each hook 6. This housing covers the opening through the removable ring and prevents the entry of dirt therein. These housings may be of any suitable construction. I have shown them as of rounded shape, conforming generally to the shape of the head of the hook 6 and as attached to the flange 4 by the screws 11. These housings preferably are of such height as to lie within the overhang of the clench of the removable ring 4. At one point beneath the rim there is similarly affixed the bridge 12 with converging walls 13 extending transversely across the under-surface of the rim, from whose fixed flange 22 a portion is cut away as shown at 14 in register therewith. This bridge 12 is adapted to receive a wedging pin 15 which is passed through a suitable aperture 16 formed in the depending flange 5 of the removable ring. This wedging pin 15 is inserted through the flange 4 after it has been rotated into the position shown in Fig. 3 and through the bridge. The extremity 17 of the pin 15 projects beyond the rim, which portion has a hole 18 therethrough adapted to receive the pin 19, which is formed to fit in the slot 14 of the fixed flange. The pin 19 has a portion 20 adapted to seat upon the pin 17, a further portion 21 serving as a boss by which it may be lifted out of the hole 18 after the bead of the tire has been disengaged from the clench 22, from which it may be freed after the tire is deflated. The pin 19 has the general configuration of that of the flange 22, having a clench portion 23 with projecting ears 24 thereon, which are adapted to seat against the beveled corners 25 of the clench 23 of the fixed flange 22, and thereby hold the pin from laterally outward displacement.

The wedging pin 15 may preferably be formed with an aperture 26 constituting a hold by which it may be readily retracted.

To accommodate the hooks 6 and the box 12, corresponding recesses are provided in the felly 1, permitting the rim to seat flush thereon.

The method of operation of my rim as shown is then as follows: The tire having been deflated, the bead 27 is disengaged from the fixed flange 22 permitting the withdrawal of the pin 19 upwardly from the hole 18. Thereupon the wedging pin 15 is withdrawn and the flange-ring 4 is rotated until it is freed from engagement with the hooks 6, whereupon it may be withdrawn laterally and the tire removed from the rim.

It will thus be seen that the engagement of the hooks serves to hold the detachable flange against lateral displacement outwardly, and prevent its further rotation in one direction, while the wedging pin prevents reverse rotation, the flange thus being locked securely upon the felly.

To mount another tire in place of the one detached, the operation is reversed: A tire is placed upon the rim 2, the flange-ring 4 is placed over the hooks 6 and rotated until the recesses 8 upon the hooks 6 engage the walls of the apertures formed in the flange 5, the wedging pin 15 is thrust through the bridge 12, and the cotter pin 19 is secured in the hole 18, the bead 27 of the tire being held away from the flange 22 to permit the vertical alinement of the cotter pin and its head 23 and the engagement of its ears 24 within the bevels 25 of the fixed flange. The bead 27 is then placed beneath the clench 22 and the tire inflated.

While I have chosen for illustration a clencher type of rim, it will be obvious to those skilled in the art that my improvement is not limited thereto but is equally usable with a straight side tire rim.

Having thus described my invention, I claim:

1. A vehicle wheel rim having a removable flange and means for detachably attaching said flange to the rim consisting of a series of rigidly mounted spaced hooks projecting laterally from said rim and adapted to enter a series of correspondingly spaced pockets formed in said flange and to permit a limited rotation of said flange to engage said hooks, and wedging means engaging said rim and said flange adapted to lock said flange in its rotated position.

2. A vehicle wheel rim having a removable flange and means rigidly affixed to said rim adapted to hold said flange against lateral displacement outwardly, said means preventing rotation in one direction and permitting a limited rotation in the reverse direction, and separately detachable wedging means adapted to lock said flange against further rotation in the reverse direction.

3. A vehicle wheel rim having a removable flange and means adapted to hold said flange against lateral displacement outwardly, said means preventing rotation in one direction, and means to lock said flange against rotation in the reverse direction, said former means comprising a series of spaced hooks projecting laterally from said rim adapted to engage with a corresponding series of slots in said flange, the latter means comprising a wedging pin adapted to extend transversely through said flange and between converging flanges formed on the under-side of said rim.

4. A clencher rim for vehicle wheels having a fixed flange and a detachable flange, means for detachably attaching the latter to the rim consisting of a series of longitudinally mounted spaced hooks projecting laterally from said rim and adapted to register with a corresponding series of slots formed in said flange and to engage with a wall of said slots when said flange is rotated, and independent wedging means for locking said flange against rotation in both directions.

5. A clencher rim for pneumatic tires, said rim having a fixed flange and a detachable flange, the latter provided with an axially projecting portion, a series of slots circumferentially spaced thereabout, and a wedging slot interposed between a pair of spaced slots, a series of circumferentially spaced hooked lugs fixed to said rim and projecting laterally below its base and adapted to extend through said detachable flange and to permit its limited rotation to engage said hooks, a wedging pin adapted to seat in said wedging slot and to extend transversely below said rim and to be received by an inverted bridge piece affixed beneath said rim.

6. In a vehicle wheel rim, the combination of a detachable flange having a radially projecting flanged portion, a plurality of spaced pockets in said projecting portion, a series of hooks formed upon the base of said rim and rigidly fixed thereto and corresponding to said pockets and adapted to project therein and each to engage said flanged projection, a flat wedge adapted to pass transversely below said rim, and through said flanged projection extending beyond the base of the rim, and a removable pin adapted to lock said wedge against withdrawal.

ANTONIO DE ROSA.

Copies of this patent may be obtained for five cents each, by addressing the "Commissioner of Patents, Washington, D. C."